United States Patent [19]

Wilson et al.

[11] 4,389,371
[45] Jun. 21, 1983

[54] PROCESS FOR INHIBITING THE CORROSION OF ALUMINUM

[75] Inventors: Joe C. Wilson, Woodhaven; Stephen E. Eisenstein, Oak Park; Jerrold F. Maxwell, Trenton; Stanley T. Hirozawa, Birmingham, all of Mich.

[73] Assignee: BASF Wyandotte Corporation, Wyandotte, Mich.

[21] Appl. No.: 281,516

[22] Filed: Jul. 8, 1981

Related U.S. Application Data

[63] Continuation of Ser. No. 75,689, Sep. 14, 1979, abandoned.

[51] Int. Cl.$^3$ .................. C23F 11/14; C23F 11/16; C23F 11/18
[52] U.S. Cl. ................. 422/15; 252/75; 252/76; 252/389 R; 252/389 A; 252/390; 422/7; 422/14; 422/16; 422/17; 422/18; 422/19
[58] Field of Search ........... 252/75, 76, 389 R, 389 A, 252/390; 422/7, 14, 15, 16, 17, 18, 19

[56] References Cited

U.S. PATENT DOCUMENTS

| | | | |
|---|---|---|---|
| 1,992,689 | 2/1935 | Cox | 252/75 X |
| 2,462,694 | 2/1949 | Walker | 252/75 |
| 2,558,030 | 6/1951 | Zisman | 252/75 |
| 3,090,757 | 5/1963 | Berger | 252/75 |
| 3,502,578 | 3/1970 | Raifsnider | 422/16 X |
| 3,758,493 | 9/1973 | Maddox | 260/309.6 |
| 3,932,303 | 1/1976 | Hollingshad | 252/390 |
| 3,935,125 | 1/1976 | Jacob | 252/389 A |
| 4,000,079 | 12/1976 | Rasp | 252/75 |

FOREIGN PATENT DOCUMENTS 1210370 10/1970 United Kingdom ............... 252/75

OTHER PUBLICATIONS

Technical Bulletin No. 962, "Monateric 1000" published Dec. 1977 by MONA Industries, Inc.
Chemical Abstracts, 88:50724b, 1978.

Primary Examiner—Dennis L. Albrecht
Attorney, Agent, or Firm—Andrew E. Pierce

[57] ABSTRACT

Corrosion inhibited alcohol compositions can be prepared which are suitable for use as anti-freeze compositions in the cooling systems of internal combustion engines. The alcohol is selected from at least one of the group consisting of methanol, ethanol, propanol, ethylene glycol, diethylene glycol, triethylene glycol, propylene glycol and glycerol. The corrosion inhibitor comprises an effective amount of a conventional corrosion inhibitor selected from the group consisting of the alkali metal carbonates, borax, the alkali metal dichromates, the alkali metal silicates, phosphorous acid, phosphoric acid, an alkali metal tungstate, benzotriazole, tolyltriazole, an alkali metal salt of benzoic or toluic acid, an alkali metal salt of a phenol, an alkanolamine and an organo-silicone compound in addition to an alkanolamine phosphate and a heterocyclic nitrogen-containing compound. The phosphate is the reaction product of an alkanolamine and phosphoric acid. The heterocyclic nitrogen-containing compound has the formula:

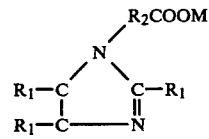

4 Claims, No Drawings

PROCESS FOR INHIBITING THE CORROSION OF ALUMINUM

This is a continuation of application Ser. No. 075,689, filed Sept. 14, 1979, now abandoned.

BACKGROUND OF THE INVENTION

1. Field of the Invention

The invention relates to a corrosion inhibited antifreeze composition useful as a coolant in a heat exchange system such as the cooling system of an internal combustion engine.

2. Prior Art

Antifreeze concentrate compositions adapted to be diluted with water and used as coolants for internal combustion engines generally contain a major amount of a water-soluble alcohol, about 0.5 to 5 percent by weight of additives to inhibit corrosion and foaming during use, and the balance water. The alcohol can be methanol, ethylene gycol, diethylene glycol, glycerol, etc. The additives besides metal corrosion inhibitors and antifoam agents can include a water-pump lubricant. As a consequence of the wide variety of metals utilized in contact with the cooling system compositions in an internal combustion engine, a wide variety of inhibitors have been proposed for use in cooling system compositions containing an alcohol. This is because no one inhibitor has yet provided protection for all of the various metals in contact with the cooling system liquid. Examples of prior art corrosion inhibitors include inorganic compounds such as alkali metal phosphates, borates, molybdates, arsenates, arsenites, nitrates, silicates, nitrites, and chromates, as well as various organic compounds such as mercaptobenzothiazole, benzotriazole, piperazine, ethylene diamine tetracetic acid and the reaction product of phosphoric acid or boric acid and an alkanolamine.

Recently, efforts have been made to eliminate the alkali metal nitrates and nitrites from antifreeze compositions as well as amine-corrosion inhibitors such as triethanolamine and diethanolamine. This is because of the possible formation of the carcinogenic nitrosamines which can be formed by the reaction of a secondary amine and a nitrite. The elimination of nitrates is believed desirable since upon reduction, nitrites are formed which could in turn react with a secondary amine to form the undesirable nitrosamines. The elimination of nitrites and nitrates from antifreeze compositions generally results in greater susceptibility of the metals in contact with such antifreeze compositions to corrode and this is particularly true of iron and steel. Heretofor, antifreeze compositions have been prepared free of alkali metal nitrites and nitrates by incorporating a corrosion inhibitor prepared by the reaction of boric acid, phosphoric acid and a mono-, di- or tri-alkanolamine together with an alkali metal mercaptobenzothiazole. Such compositions, however, have not been entirely satisfactory with respect to the inhibition of corrosion of cast iron and steel in contact with ethylene glycol-based antifreeze compositions as indicated in U.S. Pat. No. 3,350,316. Triethanolamine salts of mono- and di-nonylphenol (ethoxylate) phosphate acid esters are also known from U.S. Pat. No. 3,422,166 as corrosion inhibitors for use in metal working operations such as the working of aluminum, iron and steel.

Imidazolines are known for use in aqueous systems as corrosion inhibitors for metals in contact therewith from U.S. Pat. No. 4,000,079. Phosphoric acid and an alkanolamine as well as sodium nitrite and sodium nitrate are disclosed as conventional corrosion inhbitors to be used therewith. However, the imidazolines of the latter patent are structurally dissimilar to those disclosed herein. Water-soluble corrosion inhibitors for metals, particularly ferrous metals, in contact with petroleum oil-well fluids are disclosed in U.S. Pat. No. 3,758,493. These are produced by reacting water-soluble aliphatic mono- and dicarboxylic acids with a substituted imidazoline. Such compounds are structurally dissimilar from the imidazolines disclosed herein.

In U.S. Pat. No. 3,932,303, the corrosion of metals by oxygen-bearing waters is disclosed as inhibited by a combination of an alkanolamine phosphate ester and at least one member selected from the group consisting of phosphates, phosphonates, and low-molecular weight polymers such as polyacrylates and polyacrylamides. Where both steel and copper are present in the same system, compounds of benzotriazole or mercaptobenzothiazole are added to the system containing the above corrosion inhibitors.

SUMMARY OF THE INVENTION

There is provided a novel mixture of corrosion inhibitors, a novel corrosion inhibited aqueous mixture, an antifreeze concentrate composition, and a process for inhibiting the corrosion of metals below sodium in the electromotive displacement series in contact with an aqueous composition utilized in a heat-exchanger as a heat-transfer liquid. The novel antifreeze compositions of the invention contain one or more conventional corrosion inhibitors such as tolyltriazole (but specifically excluding alkali metal nitrites and nitrates) in combination with an alkanolamine phosphate and a heterocyclic nitrogen compound having the formula:

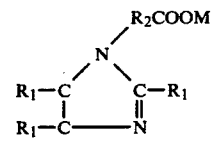

wherein $R_1$ is individually selected from hydrogen or a monovalent radical selected from the group consisting of straight or branched chain monovalent alkyl of 1 to 18 carbon atoms, monovalent alkylene of 1 to 18 carbon atoms, a monovalent cycloalkyl or alkoxy radical having up to 18 carbon atoms, monovalent aryl, monovalent alkylaryl having 1 to 18 carbon atoms in the alkyl portion, or wherein each $R_1$ is combined into a single divalent alkyl radical having 2 to 18 carbon atoms, wherein $R_2$ is a divalent radical selected from the group consisting of at least one of alkyl and alkoxy radicals having 2 to 18 carbon atoms and where alkoxy can be derived from polymerization of alkylene oxides selected from the group consisting of ethylene oxide, propylene oxide, butylene oxide, tetrahydrofuran and mixtures thereof and wherein M is an alkali metal selected from the group consisting of sodium, potassium, and lithium.

The antifreeze composition of the invention is a balanced blend of corrosion inhibitors especially effective in reducing the rate of corrosion of metals in contact with the coolant utilized in an internal combustion engine coolant system. Thus, the corrosion inhibitors in the antifreeze compositions of the invention are effective to inhibit the corrosion of all of the metals and alloy components of the typical internal combustion engine cooling system in addition to providing effective corrosion inhibition for cast-iron and steel components.

DETAILED DESCRIPTION OF THE INVENTION AND THE PREFERRED EMBODIMENTS

The antifreeze concentrate compositions of the invention comprise a major proportion of at least one water-soluble alcohol selected from the group consisting of methanol, ethanol, propanol, ethylene gycol, diethylene glycol, triethylene glycol, propylene glycol and glycerol and the inhibitor combination described in greater detail hereinafter. Ethylene glycol is presently preferred as the alcohol and especially the commercially available mixtures containing a major portion of ethylene gycol and a minor amount of diethylene glycol. The commercial mixture of ethylene glycol generally contains at least 85 to 95 percent by weight of ethylene glycol with the remainder being diethylene glycol. Preferably, about 85 to about 95 percent by weight of the total weight of the antifreeze concentrate of the invention is ethylene glycol and about 2 percent to about 10 percent by weight of said concentrate is diethylene glycol. Other water-soluble alcohols as listed above can be admixed with ethylene glycol for use in the antifreeze compositions of the invention but such compositions are usually not preferred because of the greater volatility of certain of these alcohols.

The inhibitor component of the invention is a mixture of at least one conventional corrosion inhibitor with at least one alkanolamine phosphate and at least one imidazoline as defined above. Since the imidazoline compound described above is utilized in the corrosion inhibitor composition of the invention so as to allow omission of alkali metal nitrites and nitrates from the corrosion inhibitor combination, such conventional corrosion inhibitor additives are excluded from the compositions of the invention. Other conventional corrosion inhibitors can be used such as sodium carbonate, borax, sodium dichromate, sodium silicate, phosphorus acid, phosphoric acid, an alkali metal tungstate, an alkali metal salt of benzoic or toluic acid, an alkali metal salt of a phenol, benzotriazole, tolyltriazole, an alkanolamine, and an organo-silicone compound. Such conventional corrosion inhibitors are utilized in an amount effective to inhibit corrosion when utilized in combination with the phosphate and the imidazoline compound of the invention. Generally conventional corrosion inhibitors are used in the amount of about 0.03 percent to about 5 percent by weight, preferably about 0.1 to about 2.0 percent by weight, based upon the total weight of the antifreeze concentrate. Of the conventional corrosion inhibitors, the triazoles including benzotriazole and tolyltriazole are particularly desirable for use in the antifreeze compositions of the invention. These compositions are known to inhibit the corrosion of metal where these compounds are added to cooling water which contact said metals as disclosed in U.S. Pat. No. 3,887,481. The imidazoline is also utilized in an effective amount so as to inhibit the corrosion of the metals in contact with the antifreeze composition and generally in an amount between 0.03 to about 2 percent by weight, preferably about 0.1 to about 1.0 percent by weight, based upon the total weight of the antifreeze concentrate.

The alkanolamine phosphate is included in the antifreeze composition in an effective corrosion inhibiting amount which is generally about 0.5 to about 15 percent by weight based on the total weight of the antifreeze concentrate composition of the invention. The alkanolamine phosphate can be a mono-, di-, or tri-basic alkanolamine phosphate. Generally, the alkanolamines utilized in the formation of the alkanolamine phosphates have the formula:

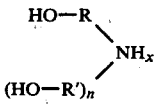

wherein x and n equal 0 to 2, x equals 2 when n equals 0, x equals 0 when n equals 2 and x equals 1 when n equals 1. Each of R and R' represents a radical selected from the group consisting of alkyl hydrocarbon radicals and alkyl ether radicals and said alkyl group has from 2 to about 12 carbon atoms in the chain. In the case of alkyl hydrocarbon radicals, those radicals having from 2 to 4 carbon atoms in the longest chain are preferred. Suitable alkanolamine phosphates include the phosphates of mono-, di-, and triethanolamine; mono-, di-, and triisopropylamine; mono-, di-, and iso-butanolamine; and butanolamine. The preferred compound for use in the preparation of the phosphate is triethanolamine.

The novel anticorrosive additive composition of the invention consists essentially of about 0.3 parts to about 50 parts, preferably about 1 to about 25 parts by weight of a conventional corrosion inhibitor selected from the conventional corrosion inhibitors recited above, about 0.3 parts to about 25 parts, preferably about 1 to about 20 parts by weight of the imidazoline compound defined above, and about 5 parts to about 150 parts, preferably about 20 to about 50 parts by weight of an alkanolamine phosphate as defined above.

The antifreeze concentrate compositions of the invention can be prepared by mixing or dissolving the corrosion inhibitors in the alcohol compounds utilized in the concentrations set out above. The method of formulating the antifreeze composition does not differ from that of the prior art with the exception of providing the novel inhibitor mixture disclosed herein. In addition to the above ingredients, the antifreeze compositions of the invention can contain other additives of the prior art such as antifoam agents, water pump lubricants, acid-base indicators, dyes and the like. Such additives can be employed in the amounts described in the prior art and are generally employed in amounts of less than 5 percent by weight based upon the weight of the antifreeze concentrate.

The pH of the aqueous liquid and antifreeze concentrate compositions of the invention is generally adjusted to pH 7-11, preferably the pH is maintained within the above pH ranges by the addition of conventional buffers which are generally salts of strong bases and weak acids. These buffer salts are well-known in the art as indicated in U.S. Pat. No. 3,121,692, incorporated herein by reference.

Useful antifoam agents are the alkoxylated nonionic surfactants which exhibit low-foaming characteristics. Examples of alkoxylated nonionic synthetic detergents which can be advantageously employed as antifoam agents in the antifreeze compositions of the invention include polyoxyalkylene adducts of hydrophobic bases, as illustrated by PLURONIC® L-61. Typical hydrophobic bases which can be condensed with alkylene oxides are the mono- and polyalkyl phenols and the compounds prepared by condensing polyoxypropylene with a hydrophobic base initiator having from about 1 to 6 carbon atoms and at least one reactive hydrogen atom. Additional useful defoamers based upon nonionic surfactants are disclosed in U.S. Pat. No. 3,931,029, incorporated herein by reference.

The antifreeze concentrate can be diluted with water in accordance the prior art practice to produce an antifreeze fluid or coolant composition having a desired freezing point. Generally, the antifreeze concentrate of the invention is diluted with about 1 to about 3 volumes of water to arrive at the coolant composition which is circulated in the cooling system of the internal combustion engine.

Many antifreeze compositions can be formulated in accordance with the teaching of the present invention. The compositions described below are merely representative of antifreeze compositions contemplated by the invention. Where not otherwise specified throughout this specification and claims, temperatures are given in degrees centigrade and parts, percentages and proportions are by weight.

EXAMPLE 1

An antifreeze concentrate composition of the present invention which is effective in inhibiting corrosion of various metals utilized in contact with the coolant in an internal combustion engine is prepared by mixing together the following ingredients.

| Ingredients | Parts by Weight |
|---|---|
| Ethylene glycol | 89.0 |
| Diethylene glycol | 5.0 |
| Water | 0.41 |
| Phosphoric acid (85%) | 1.16 |
| Triethanolamine | 4.00 |
| Tolyltriazole, sodium salt (50% aqueous) | 0.20 |
| PLURONIC® L61 | 0.03 |
| 2-heptyl-1-(ethoxypropionic acid)imidazoline, sodium salt (50% aqueous) | 0.20 |

EXAMPLE 2

(Comparative Example Forming No Part of This Invention)

A prior art antifreeze concentrate composition was prepared by admixing the following ingredients.

| Ingredients | Parts by Weight |
|---|---|
| Ethylene glycol | 96.7 |
| Phosphoric acid (85%) | 1.00 |
| Triethanolamine | 1.90 |
| Sodium mercaptobenzothiazole | 0.40 |

The antifreeze compositions of Examples 1 and 2 were tested with respect to corrosion of copper, 2006 solder, 2004 solder, brass, steel, cast iron and aluminum by the use of ASTM Glassware Corrosion Test D-1384. In this test 1 inch by 2 inch specimens of the various metals evaluated are uniformly cleaned, polished, weighed, and bolted together on an insulated rod with $\frac{1}{4}$ inch spacers between the specimens. The spacers are made from one of the two adjoining metal specimens except that a non-conducting material is used between brass and steel. The cast iron, aluminum, and solder specimens are $\frac{1}{8}$ inch thick while the steel, copper, and brass specimens are 1/16 inch thick. The specimen bundle is placed on a 1 liter tall form beaker with 250 milliliters of the antifreeze concentrate composition being tested and 500 milliliters of synthetic hard water standardized to contain 300 parts per million (p.p.m.) each of sulfate ions, bicarbonate ions, and chloride ions (sodium salt in all cases). The beaker is filled with a gas dispersion tube which extends to the bottom of the beaker. The solution is maintained at 190° F. and the aeration rate is set at 100 milliliters per minute. After 336 hours, the specimens are removed from the solution, examined visually, cleaned free of corrosion products, dried and weighed. Corrosion losses are reported as milligrams per specimen. The corrosion test results utilizing the antifreeze compositions of Examples 1 and 2 are shown in the below table.

TABLE

ASTM D-1384 Corrosion Test

| Specimen Weight Loss (mg.) | Antifreeze Composition | |
|---|---|---|
| | Example 1 | Example 2 |
| Copper | 6 | 7.4 |
| 2006 Solder | 5 | 0.0 |
| 2004 Solder | 1 | 30.5 |
| Brass | 7 | 4.6 |
| Steel | 3 | 35.2 |
| Cast Iron | 3 | 252.9 |
| Aluminum | (+1) | (+1.5) |

Note:
"+" indicates gain in weight

EXAMPLE 3

An antifreeze concentrate composition of the invention was prepared by blending the following ingredients:

| Ingredients | Parts by Weight |
|---|---|
| Ethylene glycol | 88.04 |
| Diethylene glycol | 4.7 |
| Phosphoric acid (85%) | 1.16 |
| Triethanolamine | 4.0 |
| Tolyltriazole sodium salt (50% aqueous) | 0.3 |
| PLURONIC® L61 | 0.3 |
| 2-heptyl-1-(ethoxypropionic acid) imadazoline, sodium salt (50% aqueous) | 0.2 |
| Borax, decahydrate | 1.3 |

Evaluation of Example 3 in the same manner as Examples 1 and 2 provided substantially the same corrosion test results as Example 1.

While this invention has been described with reference to certain specific embodiments, it will be recognized by those skilled in the art that many variations are possible without departing from the scope and spirit of the invention and it will be understood that it is intended to cover all changes and modification to the invention disclosed herein for the purposes of illustration which do not constitute departures from the spirit and scope of the invention.

The embodiments of the invention in which an exclusive property or privilege is claimed are defined as follows:

1. A process for inhibiting the corrosion of aluminum in contact with aqueous liquids, excluding alkali metal nitrates and nitrites, said process comprising adding to said liquid an effective amount of (A) a conventional corrosion inhibitor selected from the group consisting of at least one of the alkali metal carbonates, borax, the alkali metal dichromates, the alkali metal silicates, phosphorus acid, phosphoric acid, an alkali metal tungstate, an alkali metal salt of benzoic or toluic acid, an alkali metal salt of a phenol, benzotriazole, tolyltriazole, an alkanolamine, and an organo-silicone compound;

(B) about 0.5 percent to about 15 percent by weight of an alkanolamine phosphate; and (C) about 0.03 percent to about 2 percent by weight of a heterocyclic nitrogen compound having the formula:

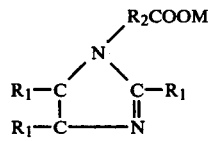

wherein $R_1$ is individually selected from hydrogen or a monovalent radical selected from the group consisting of straight or branched chain monovalent alkyl of 1 to 18 carbon atoms, monovalent cycloalkyl or alkoxy radical having up to 18 carbon atoms, a monovalent alkylene radical of 1 to 18 carbon atoms, monovalent aryl radical, a monovalent alkylaryl having 1 to 18 carbon atoms in the alkyl portion thereof, or wherein each $R_1$ is combined into a single divalent alkyl radical having 2 to 18 carbon atoms; and wherein $R_2$ is a divalent radical selected from the group consisting of at least one of an alkyl radical or an alkoxy radical each having 2 to 18 carbon atoms and wherein said alkoxy radical is derived from an alkylene oxide selected from the group consisting of ethylene oxide, propylene oxide, butylene oxide, tetrahydrofuran, and mixtures thereof; and wherein M is an alkali metal.

2. The process of claim 1 wherein said aqueous liquid is an aqueous alcohol solution and wherein said conventional corrosion inhibitor is tolyltriazole.

3. The process of claim 2 wherein said phosphate ester is derived from the reaction of triethanolamine and phosphoric acid, and said alcohol is a mixture of diethylene glycol and ethylene glycol.

4. The process of claim 3 wherein said nitrogen-containing compound is 2-heptyl-1-(ethoxypropionic acid)-imidazoline, sodium salt.

* * * * *